May 31, 1960   K. W. DERR ET AL   2,938,328
WATCH BEARING MOUNTING

Filed Jan. 16, 1956   2 Sheets-Sheet 1

INVENTOR
KENNETH W. DERR
RUSSELL W. HAUS

BY  *M. V. Gould*

ATTORNEY

May 31, 1960 K. W. DERR ET AL 2,938,328
WATCH BEARING MOUNTING
Filed Jan. 16, 1956 2 Sheets-Sheet 2

INVENTOR
KENNETH W. DERR
RUSSELL W. HAUS
BY
ATTORNEY

United States Patent Office 2,938,328
Patented May 31, 1960

2,938,328

WATCH BEARING MOUNTING

Kenneth W. Derr, Quarryville, and Russell W. Haus, Lancaster, Pa., assignors to Hamilton Watch Company, Lancaster, Pa., a corporation of Pennsylvania Filed Jan. 16, 1956, Ser. No. 559,218

1 Claim. (Cl. 58—140)

This invention relates to a shockproof mounting for balance staffs of watches and more particularly the type of mounting in which the jewels are embedded in an elastic medium.

Heretofore, in the making of shockproof mountings it has been the practice to mount the jewel bearings so that they were free to move under impact, but returnable to approximately original position through the influence of a spring. Very often it happened that after a slight shock the jewel would remain in a slightly cocked position, not returning completely to its original position. The was due mostly to the fact that there was friction to overcome between the jewels and the means for supporting the jewel. Any slight canting of the jewel bearings, of course, affected the timekeeping ability of the watch.

The object of the present invention is to provide a resilient mounting for the olived and endstone jewels of a balance staff so that they will absorb any shock and return absolutely to original position.

It is a further object of the present invention to provide a housing or supporting fixture for the jewel bearings made of an elastic material such as rubber which, when mounted, will be in an unstressed position and which will be subject to distortion under shock but will always return to original unstressed position.

It is a further object of the present invention to provide a shockproof mounting for jewel bearings of watches which will enable the two bearings used, the olived stone and the endstone, to be assembled as a unit within the mounting and to be removed from the watch as a single unit, and when removed the jewels may be snapped from the resilient mounting and replaced without injury to the mounting and without disturbing the position of the jewels in the mounting.

It is a still further object of the present invention to mount in a flat resilient washer molded to fit the perimeter of the jewels the endstone and olived stone singly and to press fit such washers into a plate, and so provide relative adjustment of the space between the olived stone and the endstone by simply moving the washers in the carrying plate.

It is a further object of the present invention to provide a resilient shockproof mounting which can be made from comparatively heavy stock, and the web between the supporting edges of the mounting and the central support of the mounting designed to support the jewel bearings formed with a series of perforations to increase the flexibility under shock and yet at the same time provide sufficient stability due to the webs between the perforations to maintain the jewel in desired position.

It is a still further object of the present invention to provide a shockproof mounting for jewels in which the shockproofing is a function of the material in which the bearings are mounted.

The invention is disclosed in the accompanying drawings in which.

Figure 1:
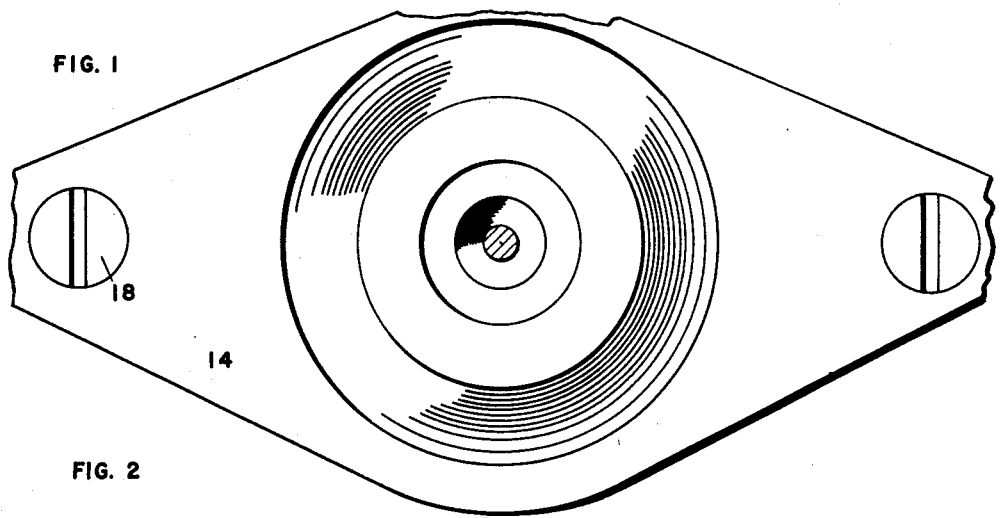
Figure 1 is a top plan view showing the bearing mounting.
Figure 2:
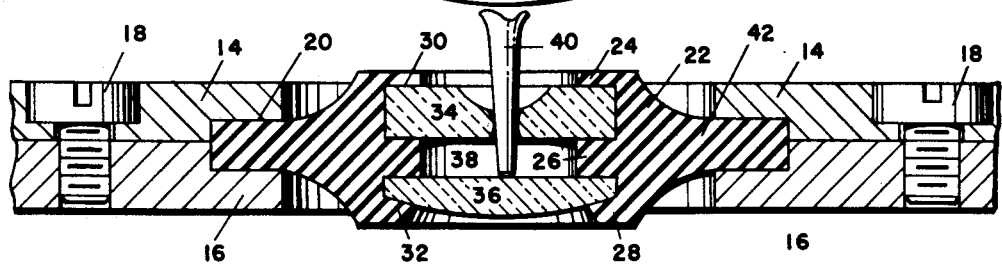
Figure 2 is a longitudinal cross section of the same mounting.

Referring particularly to Figures 1 and 2, a bearing holder is formed with an upper part 14 and a lower matching part 16 held together by screws 18. A central annular groove 20 is formed by the joining of the upper and lower parts of the holder and provides a retainer for a molded resilient jewel housing 22.

The jewel housing 22 is formed with an upper flange 24, a middle flange 26 and a lower flange 28 which serve to locate upper annular groove 30 and lower annular groove 32. Carried in the upper annular groove 30 is an olived jewel bearing 34 while the lower annular groove supports an endstone 36. The thickness of the middle flange 26 determines the distance between the olived jewel and the endstone. As this is a molded product, this dimension may be thus kept constant and of an exact predetermined size. It furthermore provides a central cavity 38 which may contain oil.

The jewels 34 and 36 are supported in the flexible housing 22 to provide a bearing support for the balance staff 40 and insure against the breaking of said staff by any sudden shocks. The housing member 22 may be made sufficiently flexible and yet kept sufficiently rigid so that shocks will be absorbed and yet the balance staff will always be in correct relative vertical position, always returning to the same position after each disturbance. The jewel bearings are supported so that they form a single unit, the shock being taken not by movement of one of the bearings relative to the other but by movement of the unit as a whole by the flexure at the points 42 of the member 22. Due to the inherent resiliency of the member 22, there will also be flexibility in a horizontal direction.

Figure 3:
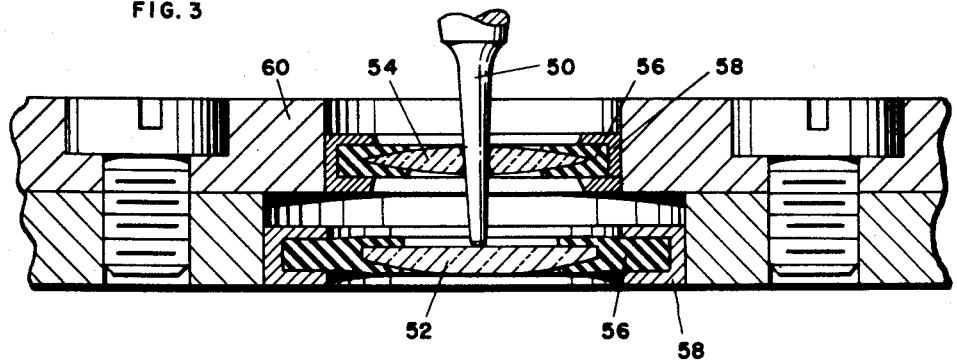
Figure 3 is a cross sectional view of a modified form of the mounting.

Figure 3 shows a modification in which the balance staff 50 is supported against an endstone 52 and has an olived jewel bearing support 54. Each of these supports is mounted in their resilient member 56 carried in retaining rings 58 which are press fitted in a block 60.

Figure 4:
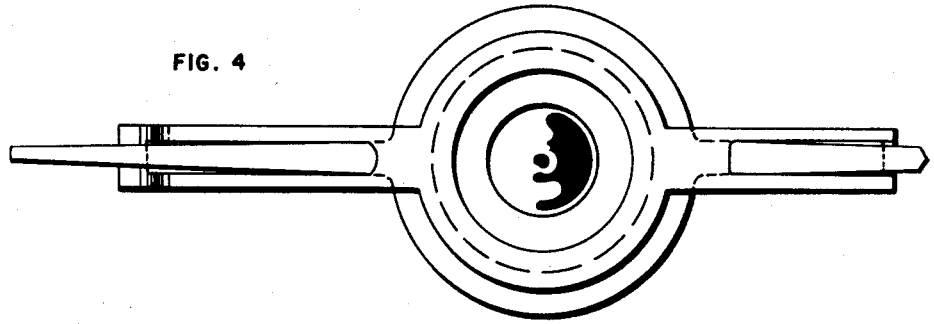
Figure 4 is a top plan view of the shockproof mounting.
Figure 5:
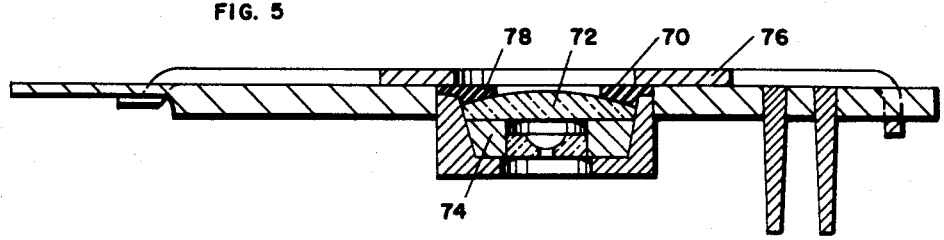
Figure 5 is a longitudinal cross section of the same.

Figures 4 and 5 show a further modification in which a flexible retaining element 70 holds a capstone 72 in normal position against an olived jewel bearing retaining member 74. A retaining clip 76 engages the resilient member 70 and holds it in contact with the jewel 72, the overlying edges 78 of the resilient member 70 allowing a certain flexibility and permitting a slight movement of the endstone 72 upon shock directed against the member.

Figure 6:
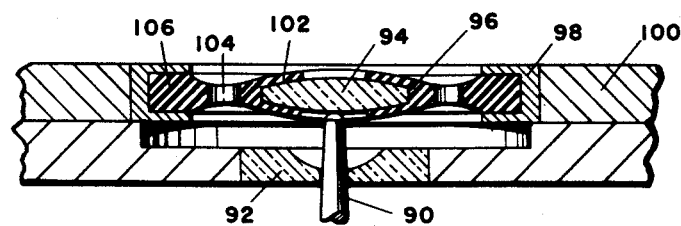
Figure 6 is a cross section of a modified form of the mounting.
Figure 7:
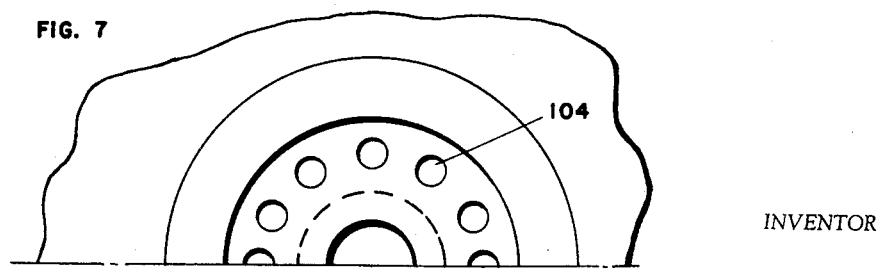
Figure 7 is one-half of a top plan view of the mounting shown in Figure 6.

Figures 6 and 7 show a still further modification in which the balance staff 90 is supported in the jewel bearing 92 and against an endstone 94. The endstones are mounted in a resilient member 96 which is carried in a rim 98 press fitted into plate 100. The resilient member 96 has a central annular groove 102 in which the endstone 94 is housed. The member 96 is perforated by a series of holes 104 arranged in a circle around the jewel and located between the center and the supporting rim 106. The holes 104 permit the use of a heavier material while retaining the same degree of flexibility.

What is claimed is:

A jewel bearing mounting for balance staffs, comprising a body portion formed of inherently resilient material, means supporting a pair of jewel bearings in predetermined spaced position relative to each other and centrally of said body, said body extending upwardly and inwardly to overlap the outer edges of the upper and lower surfaces of said jewel bearings and being formed with an outside annular rim of reduced thickness spaced approximately midway of the upper and lower ends of said body, a pair of holder members having opposed recessed portions defining a central annular groove for receivably engaging the outer edges of said rim, said holder members constituting the sole support for said body, and means for drawing said holder members together under pressure to securely grip said outer edges and support said bearing mounting in shock absorbing position.

References Cited in the file of this patent

FOREIGN PATENTS

| | | |
|---|---|---|
| 230,295 | Switzerland | Mar. 16, 1944 |
| 243,388 | Switzerland | Jan. 3, 1947 |
| 967,666 | France | Mar. 29, 1950 |
| 296,070 | Switzerland | Apr. 1, 1954 |